United States Patent
Teramura et al.

(10) Patent No.: US 8,882,177 B2
(45) Date of Patent: Nov. 11, 2014

(54) AERODYNAMIC NOISE REDUCTION DEVICE

(71) Applicant: Honda Motor Co., Ltd., Tokyo (JP)

(72) Inventors: Minoru Teramura, Wako (JP); Kei Ambo, Wako (JP); Takashi Yoshino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/059,769

(22) Filed: Oct. 22, 2013

(65) Prior Publication Data

US 2014/0117711 A1    May 1, 2014

(30) Foreign Application Priority Data

Oct. 26, 2012   (JP) ................................. 2012-236237

(51) Int. Cl.
*B60J 1/20* (2006.01)
*B62D 35/00* (2006.01)

(52) U.S. Cl.
CPC .................................... *B62D 35/008* (2013.01)
USPC ......................................... 296/180.1; 296/91

(58) Field of Classification Search
CPC ............................. B62D 25/084; G10K 11/172
USPC ......... 296/193.06, 193.09, 180.1–180.5, 154, 296/217, 91; 454/164
See application file for complete search history.

(56) References Cited

U.S. PATENT DOCUMENTS

| | | | |
|---|---|---|---|
| 3,529,862 A * | 9/1970 | Jousserandot | 296/180.1 |
| 3,635,517 A * | 1/1972 | Wilfert et al. | 296/208 |
| 4,538,851 A * | 9/1985 | Taylor | 296/180.1 |
| 6,186,886 B1 * | 2/2001 | Farrington et al. | 454/141 |
| 6,340,192 B2 * | 1/2002 | Pike et al. | 296/91 |
| 6,468,149 B2 * | 10/2002 | Essig et al. | 454/164 |
| 7,641,275 B2 * | 1/2010 | Campbell et al. | 296/217 |
| 8,132,850 B2 * | 3/2012 | Dannhaeuser et al. | 296/181.5 |
| 8,172,307 B2 * | 5/2012 | Froeschle et al. | 296/180.1 |
| 8,191,955 B2 * | 6/2012 | August | 296/180.1 |
| 8,454,083 B2 * | 6/2013 | Dimitriou et al. | 296/193.06 |
| 2009/0088065 A1 * | 4/2009 | Mouch et al. | 454/164 |

FOREIGN PATENT DOCUMENTS

JP    2003-254226    9/2003

* cited by examiner

*Primary Examiner* — Pinel Romain
(74) *Attorney, Agent, or Firm* — Rankin, Hill & Clark LLP

(57) ABSTRACT

An aerodynamic noise reduction device reduces aerodynamic noise originating from a separation region located downstream of a step portion protruding from a surface of an object placed in an airflow. Since the step portion protrudes from the surface of the object placed in the airflow, aerodynamic noise is generated from the airflow separation region located downstream of the step portion. However, by forming an air discharge vent at the step portion at a position near a point, in the separation region, where a Reynolds stress is at its maximum and by discharging air from the air discharge vent toward the point where the Reynolds stress is at its maximum, the velocity gradient in the separated shear layer in the separation region is mitigated to decrease the maximum value of the Reynolds stress. The aerodynamic noise is thus effectively reduced.

20 Claims, 5 Drawing Sheets

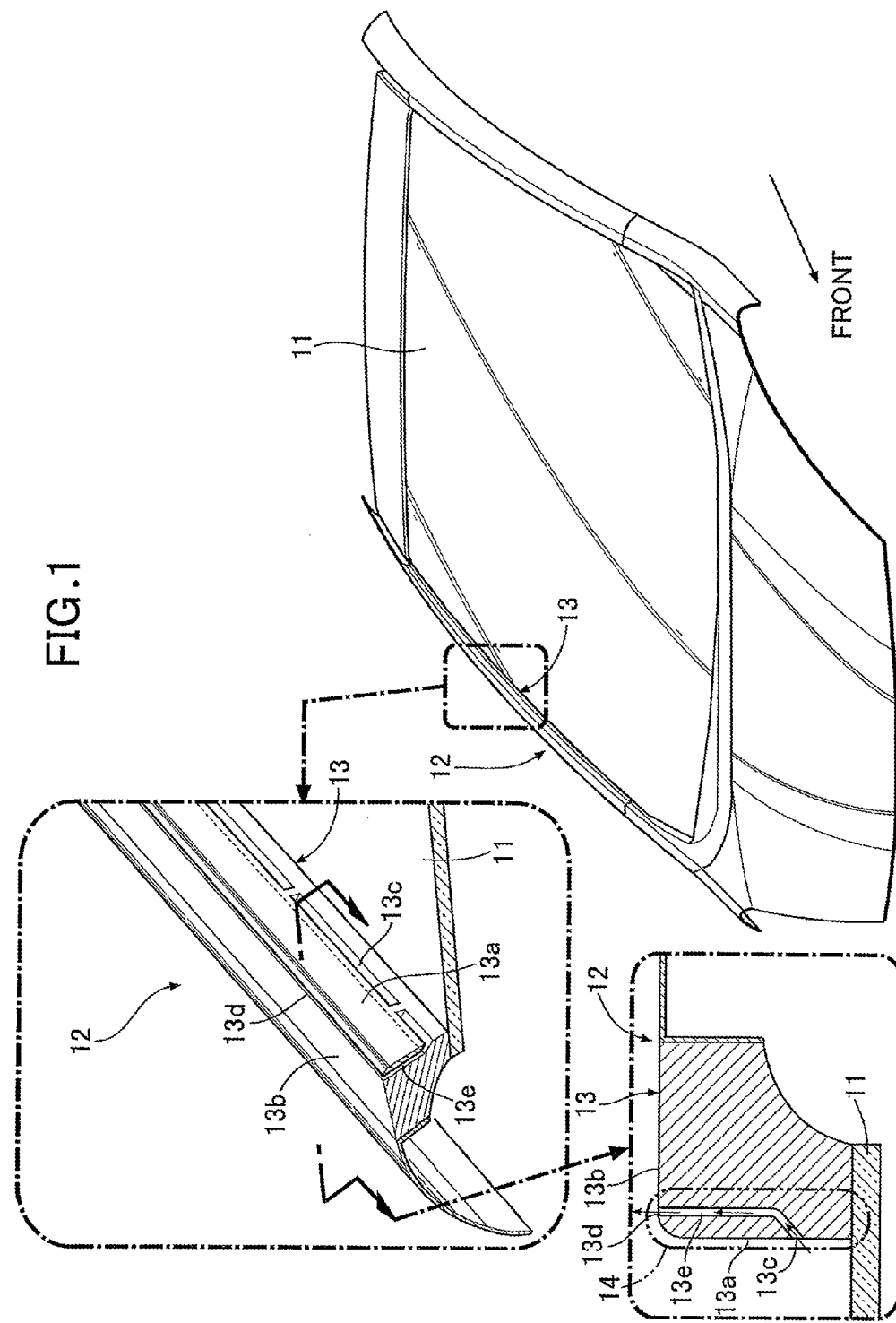

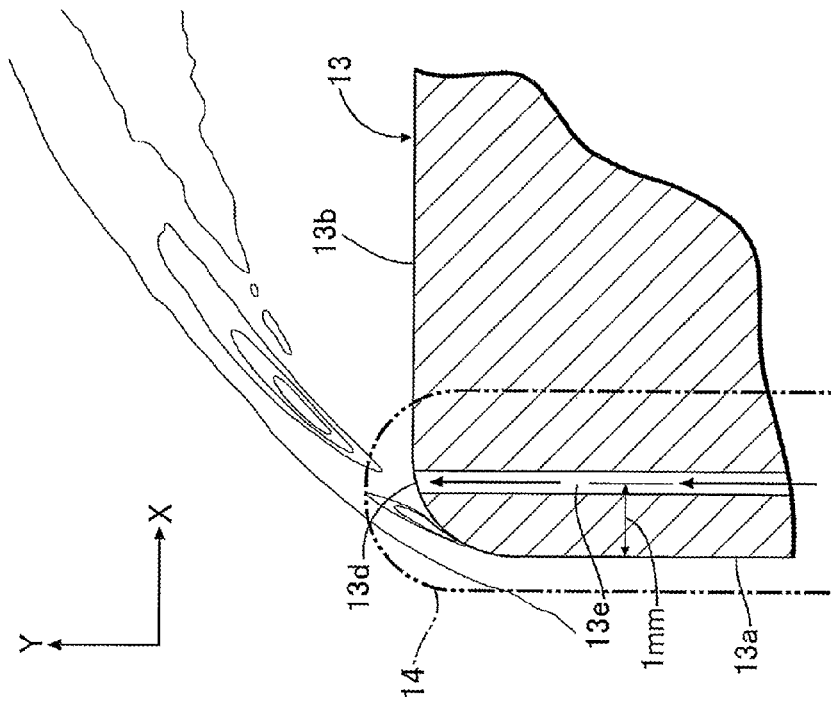
FIG.2A EMBODIMENT
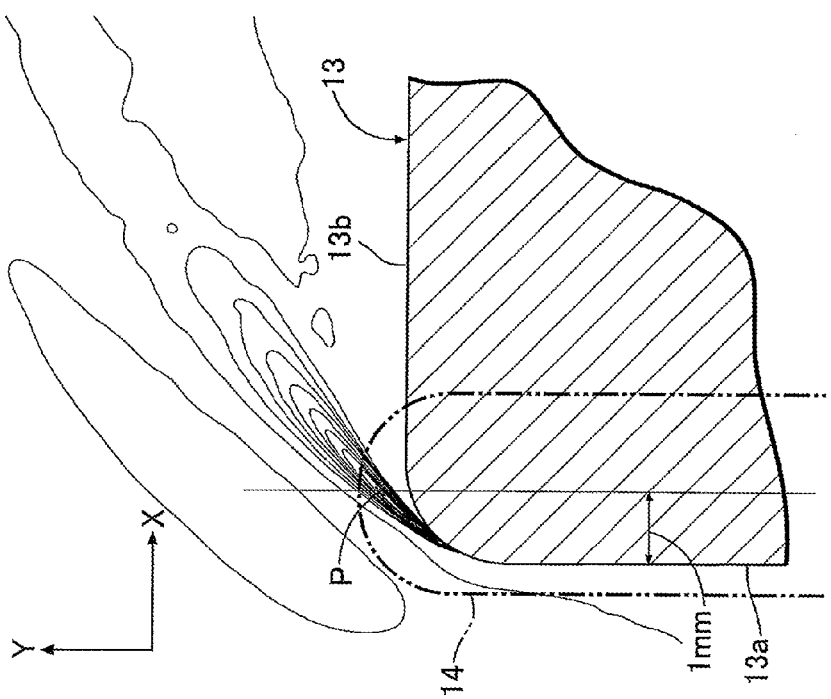
FIG.2B COMPARATIVE EXAMPLE

AERODYNAMIC NOISE REDUCTION DEVICE

CROSS-REFERENCE TO RELATED APPLICATIONS

The present application claims priority under 35 USC 119 to Japanese Patent Application No. 2012-236237 filed on Oct. 26, 2012 the entire contents of which are hereby incorporated by reference.

BACKGROUND OF THE INVENTION

1. Field of the Invention

The present invention relates to an aerodynamic noise reduction device which reduces aerodynamic noise originating from a separation region located downstream of a step portion protruding from a surface of an object placed in an airflow.

2. Description of Related Art

There is known, from Japanese Patent Application Laid-open No. 2003-254226, a windmill airflow noise reduction device which is provided with air jet vents near a rear edge portion of each sail of a windmill, and reduces noise by injecting air from the air jet vents to a flow separation region on a surface of the sail.

This windmill airflow noise reduction device injects air from the air jet vents to generate eddies between the sail surface and the separation region with the air flow, and causes these eddies to interfere with eddies in the separation region, so as to encourage a separated airflow to be drawn and reattached to the sail surface. The separation region is thus decreased, reducing the noise.

BRIEF SUMMARY OF THE INVENTION

However, the noise reduction device described in the above patent document aims to achieve noise reduction indirectly by decreasing the separation region including the eddies which act as a source of noise, but does not suppress the source of noise itself directly. Hence, the noise reduction effect is limited. Furthermore, although this noise reduction device decreases the separation region by using the eddies generated between the sail surface and the separation region by use of the flow of air injected from the air jet vents, the eddies per se generated by the air injected from the air jet vents possibly become a new source of noise, preventing a sufficient noise reduction effect from being obtained.

The present invention has been made in view of the above circumstances, and has an objective of reducing aerodynamic noise originating from a separation region located downstream of a step portion protruding from a surface of an object placed in an airflow.

In order to achieve the object, according to a first feature of the present invention, there is provided an aerodynamic noise reduction device which reduces aerodynamic noise originating from a separation region located downstream of a step portion protruding from a surface of an object placed in an airflow, wherein an air discharge vent is formed at the step portion at a position near a point, in the separation region, where a Reynolds stress is at its maximum, and air is discharged from the air discharge vent toward the point where the Reynolds stress is at its maximum.

The following effect can be obtained according to the configuration of the first aspect of the present invention. Specifically, since the step portion protrudes from the surface of the object placed in an airflow, aerodynamic noise is generated from the airflow separation region located downstream of the step portion. However, by forming the air discharge vent at the step portion at a position near the point, in the separation region, where the Reynolds stress is at its maximum and by discharging air from the air discharge vent toward the point where the Reynolds stress is at its maximum, the velocity gradient in the separated shear layer in the separation region is mitigated to decrease the maximum value of the Reynolds stress. The aerodynamic noise is thus effectively reduced.

According to a second feature of the present invention, in addition to the first feature, an air intake vent is formed at the step portion, and the air intake vent and the air discharge vent communicate with each other via a communication channel.

The following effect can be obtained according to the configuration of the second aspect of the present invention. Specifically, the air intake vent is formed in the step portion, and the air intake vent and the air discharge vent communicate with each other via the communication channel. Thus, air taken in through the air intake vent passes through the communication channel and is discharged from the air discharge vent. Hence, a special drive source for discharging air from the air discharge vent is unnecessary.

According to a third feature of the present invention, in addition to the first or second feature, a velocity of the air discharged from the air discharge vent is half or larger than a velocity of a main flow.

According to the configuration of the third aspect of the present invention, an utmost noise reduction effect can be obtained if the velocity of the air discharged from the air discharge vent is half or larger than the velocity of the main flow.

Note that the front glass and the front pillar of the embodiment correspond to the object of the present invention.

The above and other objects, characteristics and advantages of the present invention will be clear from detailed descriptions of the preferred embodiments which will be provided below while referring to the attached drawings.

BRIEF DESCRIPTION OF THE DRAWINGS

FIG. 1 is a diagram showing a step portion at a front edge of a front pillar of an automobile.

FIGS. 2A and 2B are cross-sectional elevation views showing a Reynolds stress distribution near the step portion.

DETAILED DESCRIPTION OF THE INVENTION

Figure 3:
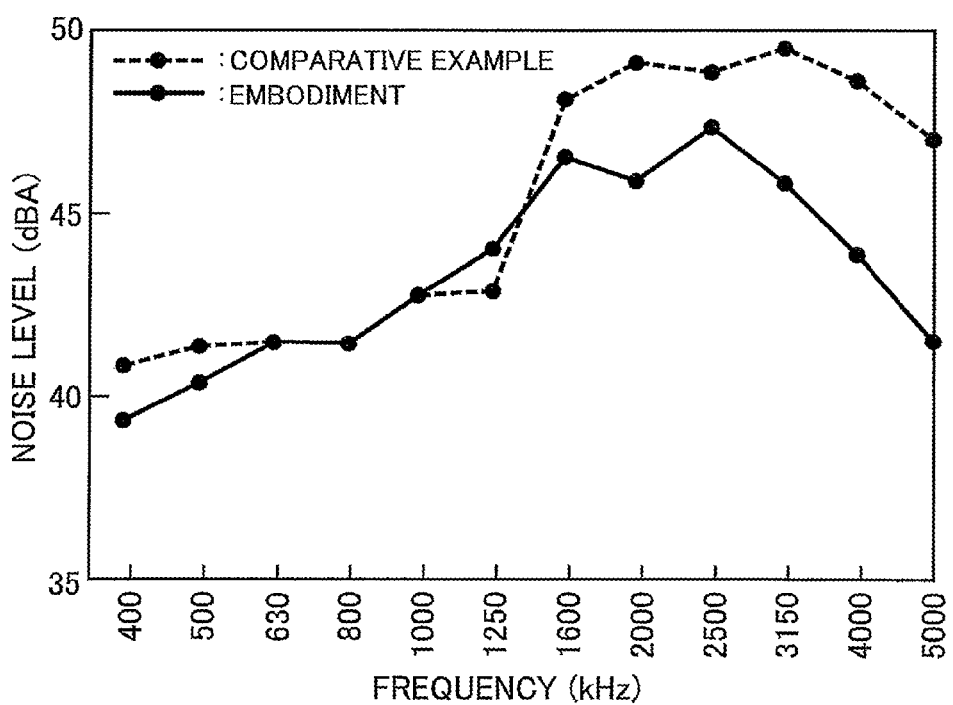
FIG. 3 is a graph illustrating an effect of noise level reduction by discharging air.

An embodiment of the present invention is described below based on FIGS. 1 to 5.

As shown in FIGS. 1 and 2, this embodiment aims to achieve reduction in aerodynamic noise generated at a step portion 14 between a front glass 11 and a front pillar 12 of an automobile. A front edge member 13 of a square-column shape is provided at a front edge of the front pillar 12. The front edge member 13 has a front face 13a and a side face 13b adjacent to each other. An air intake vent 13c and an air discharge vent 13d, which are slit-shaped and extend in parallel to a longitudinal direction of the front pillar 12, are formed in the front face 13a and the side face 13b, respectively. The front face 13a and the side face 13b communicate with each other via a communication channel 13e formed inside the front edge member 13 and bent into an L shape.

Thus, the front pillar 12 protrudes, in a step form, from a surface of the flat front glass 11, and the step portion 14 is formed between the front glass 11 and the front edge member 13 of the front pillar 12. Part of traveling wind that hits the front glass 11 while the automobile is travelling flows toward a roof located rearward, but the other part thereof flows to an outer side in a vehicle width direction, flows over the step portion 14 between the front glass 11 and the front face 13a of the front edge member 13 of the front pillar 12, and then flows rearward along the side face 13b of the front edge member 13 of the front pillar 12. The flow of air directed to the front pillar 12 contains a component of velocity in the longitudinal direction of the front pillar 12 and a component of velocity in a direction orthogonal to the longitudinal direction of the front pillar 12. Herein, the latter component, i.e., the component of velocity in the direction orthogonal to the longitudinal direction of the front pillar 12, is focused on.

FIGS. 2A and 2B are enlarged views each showing an area at and around an edge between the front face 13a and the side face 13b of the front edge member 13, each view showing a section of the front pillar 12 taken in a direction orthogonal to the longitudinal direction of the front pillar 12. In FIGS. 2A and 2B, directions are defined such that an X direction is a direction of a main flow which is along the front glass 11 and the side face 13b of the front edge member 13, and a Y direction is a direction orthogonal thereto, namely, a direction normal to the front glass 11 and the side face 13b of the front edge member 13. According to this definition, the air intake vent 13c of the front face 13a of the front edge member 13 is open in the X direction facing the main flow direction, and the air discharge vent 13d of the side face 13b of the front edge member 13 is open in the Y direction orthogonal to the main flow direction.

Since the step portion 14 is present between the front glass 11 and the front pillar 12, an airflow is separated from the edge between the front face 13a and the side face 13b of the front edge member 13, and a separation region is formed behind the edge. Since the front pillar 12 is a straight member having a substantially constant section, it is assumed that a flow passing the step portion 14 of the front pillar 12 is a two-dimensional flow within an X-Y plane in FIG. 2. Velocities of a turbulent flow at the separation region include a velocity u in the X direction (the main flow direction) and a velocity v in the Y direction (a direction of the height of the step portion 14), and are represented by $$u = u_{AV} + u'$$

$$v = v_{AV} + v'$$

where $u_{AV}$ is a temporal average velocity in the X direction, u' is a fluctuating velocity in the X direction, $v_{AV}$ is a temporal average velocity in the Y direction, and v' is a fluctuating velocity in the Y direction. In other words, the X-direction velocity u is the sum of the X-direction temporal average velocity $u_{AV}$ and the X-direction fluctuating velocity u', and the Y-direction velocity v is the sum of the Y-direction temporal average velocity $v_{AV}$ and the Y-direction fluctuating velocity v'.

A shear stress (Reynolds stress) τ generated by a turbulent flow is represented by $$\tau = -\rho \cdot (u' \cdot v')_{AV}$$

where ρ is an air density. Here, $(u' \cdot v')_{AV}$ is a temporal average of a product of the X-direction fluctuating velocity u' and the Y-direction fluctuating velocity v'. When the X-direction fluctuating velocity u' and the Y-direction fluctuating velocity v' have a predetermined correlation, $(u' \cdot v')_{AV}$ is not zero, and the Reynolds stress τ is generated. If the Reynolds stress τ at a flow field within the X-Y plane is calculated assuming that a source of noise at the separation region is a transverse eddy in the turbulent flow generated at a position where the Reynolds stress τ is at its maximum, a portion where the value of the Reynolds stress τ is at its maximum can be specified as the source of noise.

FIG. 2B shows a comparative example which does not perform the air discharge. Each contour line in FIG. 2B is formed by connecting points that have an equal Reynolds stress τ. FIG. 2B shows that a point P of a vertex of the contour lines is where the Reynolds stress τ is at its maximum and is therefore the source of noise. It can be seen from FIG. 2B that the Reynolds stress τ is large since the density of the contour lines is high, and that an X-direction position of the point P where the Reynolds stress τ is at its maximum is located at a position about 1 mm behind the front face 13a of the front edge member 13.

FIG. 2A shows the embodiment performing the air discharge. The air discharge vent 13d of the front edge member 13 is open, directed to the above-described point P where the Reynolds stress τ is at its maximum. Owing to this configuration, part of air colliding with the front face 13a of the front edge member 13 flows into the air intake vent 13c, passes through the communication channel 13e, and is discharged from the air discharge vent 13d toward the point P where the Reynolds stress τ is at its maximum.

When the source of noise in the separation region is constantly supplied with air from the air discharge vent 13d in this way, a velocity gradient in a separated shear layer is mitigated to decrease the Reynolds stress τ, as can be seen from FIG. 2A in which the contour lines are thin. As a result, the aerodynamic noise is effectively reduced. Directing the air discharge vent 13d toward the point P where the Reynolds stress τ is at its maximum makes the effect of reducing the aerodynamic noise noticeable.

FIG. 3 shows noise levels at various frequencies for the comparative example not performing the air discharge (see the dotted line) and for the embodiment performing the air discharge (see the solid line). It can be seen from the graph that the air discharge allows a reduction in the noise level at, not all, but most of the frequencies.

Figure 4:
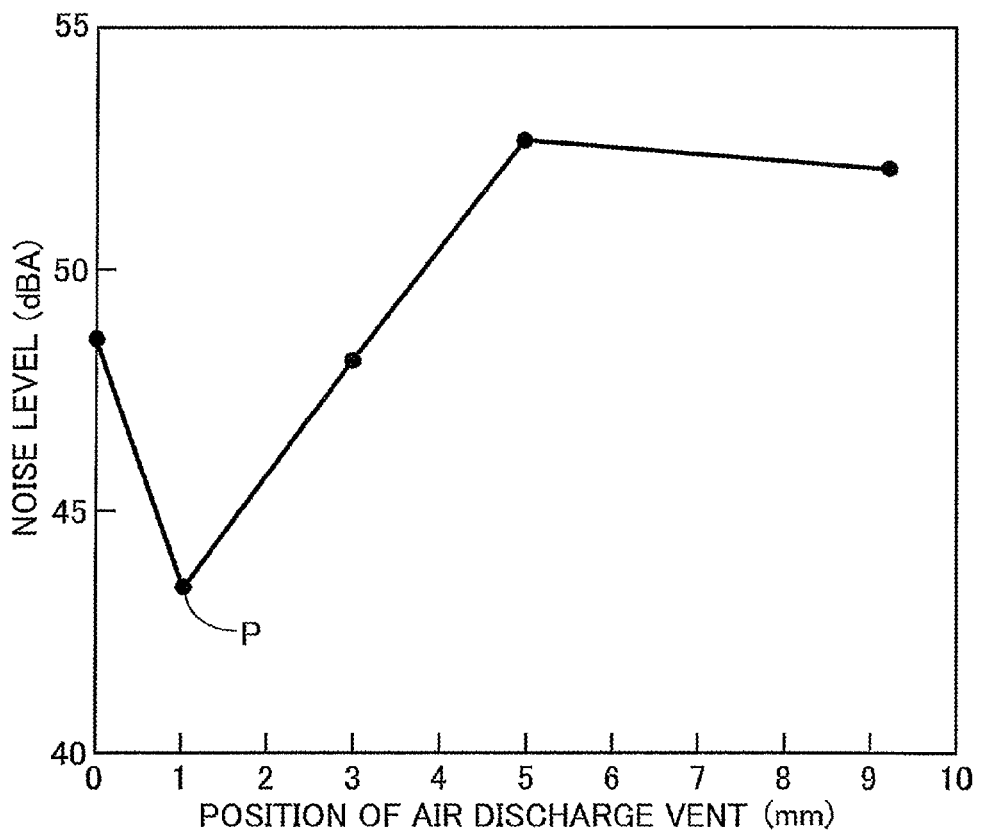
FIG. 4 is a graph showing a relationship between the position of an air discharge vent and the noise level.

FIG. 4 shows noise levels obtained while changing the position of the air discharge vent 13d behind the front face 13a of the front edge member 13. It can be seen from FIG. 4 that the noise level decreases drastically when the air discharge vent 13d is located at a position 1 mm behind the front face 13a of the front edge member 13 and is directed to the point P where the Reynolds stress τ is at its maximum.

Figure 5:
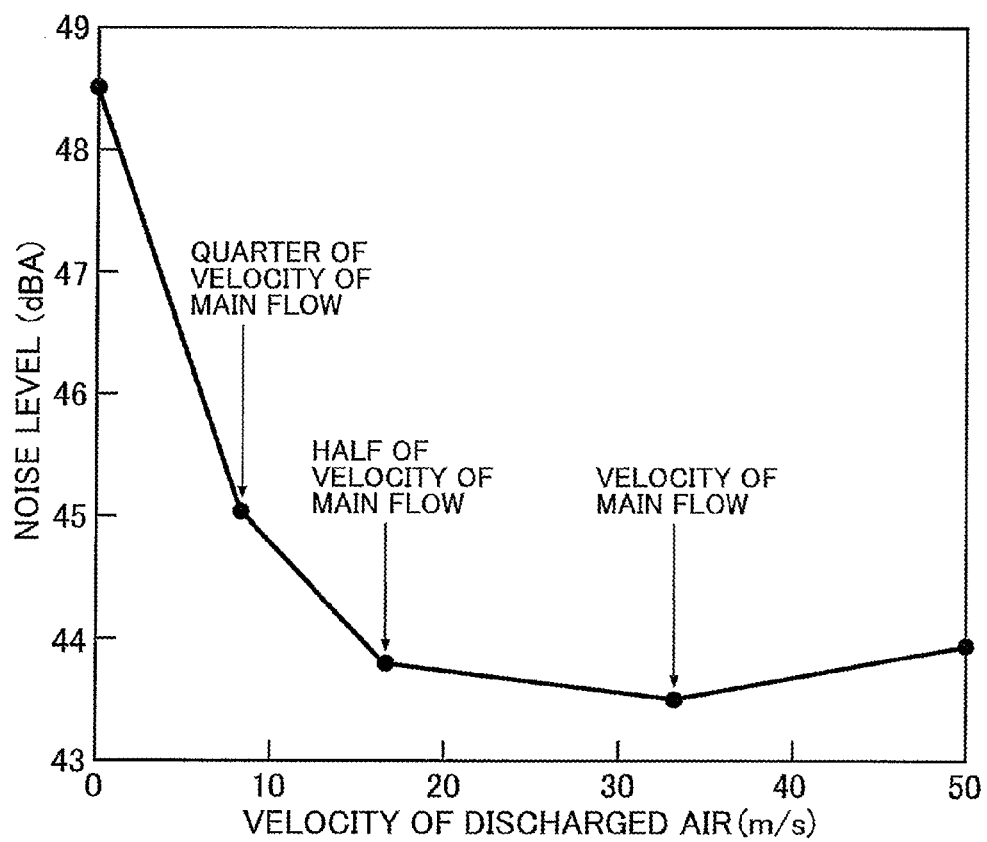
FIG. 5 is a graph showing a relationship between the velocity of discharged air and the noise level.

FIG. 5 shows noise levels obtained while changing the velocity of air discharged from the air discharge vent 13d, with the position of the air discharge vent 13d being fixed at a position 1 mm away from the front surface 13a of the front edge member 13. As the velocity of discharged air increases, the noise level decreases drastically, and after the velocity of discharged air becomes about half the velocity of a main flow, the noise level is kept substantially constant even after the velocity of discharged air increases. In other words, it can be seen from FIG. 5 that an utmost noise reduction effect can be obtained if the velocity of discharged air is about half or larger than the velocity of the main flow. FIG. 5 highlights the velocity of discharged air at: a Quarter of the velocity of the main flow; half of the velocity of the main flow; and the velocity of main flow.

As described above, according to this embodiment, the following effect can be obtained. Specifically, when the front pillar 12 protrudes, via the step portion 14, from the surface of the front glass 11, an airflow is separated at the step portion 14, generating aerodynamic noise. However, by forming the air discharge vent 13d in the step portion 14 at a position near the point P, in the separation region, where the Reynolds stress τ is at its maximum and by discharging air from the air discharge vent 13d toward the point P where the Reynolds stress τ is at its maximum, the velocity gradient in the separated shear layer in the separation region is mitigated to decrease the maximum value of the Reynolds stress τ. Consequently, the aerodynamic noise is effectively reduced. An utmost noise reduction effect can be obtained if the velocity of the air discharged from the air discharge vent 13d is half or larger than the velocity of the main flow.

Moreover, the air intake vent 13c and the air discharge vent 13d are formed at the front face 13a and the side face 13b, respectively, of the front edge member 13 of the front pillar 12, the front face 13a and the side face 13b constituting the step portion 14. The air intake vent 13c and the air discharge vent 13d communicate with each other via the communication channel 13e, allowing air taken in through the air intake vent 13c to pass through the communication channel 13e and then to be discharged from the air discharge vent 13d. Consequently, a special drive source, such as a pump or the like, for discharging air from the air discharge vent 13d is unnecessary, which contributes to reduction in the number of components, man-hours for assemblage, space, and costs.

Although the embodiment of the present invention has been described above, the present invention can be variously changed in its design without departing from the gist of the present invention.

For example, although the present invention is applied to the step portion 14 between the front glass 11 and the front pillar 12 of an automobile in this embodiment, the present invention is applicable to any place of any object other than the automobile, as well.

Further, although travelling wind is taken in through the air intake vent 13c and discharged from the air discharge vent 13d in the embodiment, air compressed by a pump or the like or air accumulated under pressure in a tank may be discharged from the air discharge vent 13d.

What is claimed is:

1. An aerodynamic noise reduction device which reduces aerodynamic noise originating from a separation region located downstream of a step portion protruding from a surface of an object placed in an airflow, the aerodynamic noise reduction device comprising:
an air discharge vent formed at the step portion at a position near a point, in the separation region, where a Reynolds stress is at a maximum, and the air discharge vent is formed and positioned so as to direct air discharged therefrom to the point in the separation region where the Reynolds stress is at the maximum, wherein
air is discharged from the air discharge vent toward the point where the Reynolds stress is at the maximum.

2. The aerodynamic noise reduction device according to claim 1, further comprising:
an air intake vent formed at the step portion, and
a communication channel that connects the air intake vent and the air discharge vent together to allow communication between the air intake vent and the air discharge vent,
wherein the air discharged from the air discharge vent enters the air intake vent and is communicated to the air discharge vent by the communication channel.

3. The aerodynamic noise reduction device according to claim 1, wherein a velocity of the air discharged from the air discharge vent is equal to at least half of a velocity of a main flow.

4. The aerodynamic noise reduction device according to claim 3, wherein the main flow is an air flow travelling in a lateral direction of the object.

5. The aerodynamic noise reduction device according to claim 2, wherein the air discharge vent, the air intake vent, and the communication channel are formed so that a velocity of the air discharged from the air discharge vent is equal to at least half of a velocity of a main flow.

6. The aerodynamic noise reduction device according to claim 5, wherein the main flow is an air flow travelling in a lateral direction of the object.

7. The aerodynamic noise reduction device according to claim 2, wherein the air intake vent and the air discharge vent are slit-shaped and extend in parallel to a longitudinal direction of the object.

8. The aerodynamic noise reduction device according to claim 7, wherein the object is at least one of a front glass and a front pillar of an automobile.

9. The aerodynamic noise reduction device according to claim 2, wherein the air intake vent is formed at a position on the step portion so as to face a direction of travel of a main flow.

10. The aerodynamic noise reduction device according to claim 9, wherein the air discharge vent, the air intake vent, and the communication channel are formed so that a velocity of the air discharged from the air discharge vent is equal to at least half of a velocity of the main flow.

11. The aerodynamic noise reduction device according to claim 2, wherein the air intake vent is formed on a front face of the object, and the air discharge vent is formed on a side face of the object that is different than and adjacent to the front face.

12. The aerodynamic noise reduction device according to claim 11, wherein the air discharge vent, the air intake vent, and the communication channel are formed so that a velocity of the air discharged from the air discharge vent is equal to at least half of a velocity of the main flow.

13. The aerodynamic noise reduction device according to claim 11, wherein the air discharge vent is formed on the side face of the object in a same lateral position as the point in the separation region where the Reynolds stress is at the maximum.

14. The aerodynamic noise reduction device according to claim 2, wherein
the object is a front glass and a front pillar with a front edge member provided at a front edge of the front pillar of an automobile,
the air intake vent is formed on a front face of the front edge member,
the air discharge vent is formed on a side face of the front edge member that is adjacent to the front face,
the air intake vent is formed at a position on the front face of the front edge member so as to face a direction of travel of a main flow, the main flow being an airflow that flows laterally across the front glass toward the front pillar.

15. The aerodynamic noise reduction device according to claim 14, wherein the air discharge vent, the air intake vent, and the communication channel are formed so that a velocity of the air discharged from the air discharge vent is equal to at least half of a velocity of the main flow.

16. The aerodynamic noise reduction device according to claim 14, wherein the air discharge vent is formed on the side face of the front edge member in a same lateral position as the point in the separation region where the Reynolds stress is at the maximum.

17. The aerodynamic noise reduction device according to claim 5, wherein the object is a front glass and a front pillar with a front edge member provided at a front edge of the front pillar of an automobile, and the main flow is an air flow travelling in a lateral direction across the front glass toward the front pillar.

18. The aerodynamic noise reduction device according to claim 17, wherein the air intake vent is formed at a position on the front face of the front pillar so as to face a direction of travel of the main flow.

19. The aerodynamic noise reduction device according to claim 1, wherein the air discharge vent is formed in a same lateral position of the object as the point in the separation region where the Reynolds stress is at the maximum.

20. The aerodynamic noise reduction device according to claim 2, wherein the air discharge vent is formed in a same lateral position of the object as the point in the separation region where the Reynolds stress is at the maximum.

\* \* \* \* \*